US012760213B2

(12) United States Patent
Zhang et al.

(10) Patent No.: US 12,760,213 B2
(45) Date of Patent: Oct. 13, 2026

(54) BURST-RESISTANT, DISPERSIBLE NANO-ENCAPSULATED PHASE-CHANGE MATERIAL AND METHODS FOR PREPARING THE SAME

(71) Applicant: Nano and Advanced Materials Institute Limited, Hong Kong (HK)

(72) Inventors: Kang Zhang, Hong Kong (HK); Xiyao Zhang, Hong Kong (HK); Christopher Cheung Yec, Hong Kong (HK); Shilong Zhang, Hong Kong (HK); Jian Zhang, Hong Kong (HK); Jifan Li, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 1201 days.

(21) Appl. No.: 17/730,215

(22) Filed: Apr. 27, 2022

(65) Prior Publication Data

US 2022/0356387 A1 Nov. 10, 2022

Related U.S. Application Data

(60) Provisional application No. 63/184,187, filed on May 4, 2021.

(51) Int. Cl.
*C09K 5/06* (2006.01)
*C08F 2/22* (2006.01)
(Continued)

(52) U.S. Cl.
CPC ................ *C09K 5/063* (2013.01); *C08F 2/22* (2013.01); *C08F 2/38* (2013.01); *C08F 212/08* (2013.01);
(Continued)

(58) Field of Classification Search
CPC ... C09K 5/063; C08F 2/22; C08F 2/38; C08F 212/08; C08F 220/14; C08F 2/30;
(Continued)

(56) References Cited

U.S. PATENT DOCUMENTS 6,447,692 B1 9/2002 Momoda et al.
10,195,577 B2 2/2019 Burakowska-Meise et al.
(Continued)

FOREIGN PATENT DOCUMENTS

CN 1693317 A 11/2005
CN 1695788 A 11/2005
(Continued)

OTHER PUBLICATIONS

English Translation—CN-103804558-A (Year: 2014).*
(Continued)

*Primary Examiner* — Andrew J. Oyer
(74) *Attorney, Agent, or Firm* — IDEA Intellectual Limited; Sam T. Yip

(57) ABSTRACT

A burst-resistant, dispersible nano-encapsulated phase-change material includes at least one phase change core material and a shell. The shell includes the reaction product of a plurality of non-phase change materials comprising at least one monomer, an initiator, a crosslinker and at least one surfactant. The shell surrounds at least one phase change core material and is formed by low-energy emulsification followed by polymerization of a mixture of the phase change core material and the plurality of non-phase change materials in water. The mass ratio between at least one phase change core material and the plurality of non-phase change materials is 5-15:10. The nano-encapsulated phase-change material after said low-energy emulsification and polymerization has a particle size ranging between 50 and 500 nm and a heat of fusion of 60 J/g or greater.

9 Claims, 5 Drawing Sheets

(51) Int. Cl.

| | |
|---|---|
| ***C08F 2/38*** | (2006.01) |
| ***C08F 212/08*** | (2006.01) |
| ***C08F 220/14*** | (2006.01) |
| ***C08K 5/11*** | (2006.01) |
| ***C08K 5/23*** | (2006.01) |

(52) U.S. Cl.
CPC .............. *C08F 220/14* (2013.01); *C08K 5/11* (2013.01); *C08K 5/23* (2013.01)

(58) Field of Classification Search
CPC . C08K 5/11; C08K 5/23; B01J 13/185; D06N 3/0068; D06N 3/0088; D06N 3/14
See application file for complete search history.

(56) References Cited

U.S. PATENT DOCUMENTS

| | | | |
|---|---|---|---|
| 2010/0068525 | A1 | 3/2010 | Jung et al. |
| 2017/0175339 | A1 | 6/2017 | Rajagopalan et al. |

FOREIGN PATENT DOCUMENTS

| | | | | |
|---|---|---|---|---|
| CN | 1321735 | C | | 6/2007 |
| CN | 101255258 | A | | 9/2008 |
| CN | 101429423 | A | | 5/2009 |
| CN | 101508887 | A | | 8/2009 |
| CN | 101530772 | A | | 9/2009 |
| CN | 101544712 | A | | 9/2009 |
| CN | 101701146 | A | | 5/2010 |
| CN | 1900209 | B | | 8/2010 |
| CN | 102172502 | A | | 9/2011 |
| CN | 102653671 | A | | 9/2012 |
| CN | 102733192 | A | | 10/2012 |
| CN | 102746450 | A | | 10/2012 |
| CN | 103146349 | A | | 6/2013 |
| CN | 103342991 | A | | 10/2013 |
| CN | 103801240 | A | | 5/2014 |
| CN | 103804558 | A | * | 5/2014 |
| CN | 104449590 | A | | 3/2015 |
| CN | 103191670 | B | | 5/2015 |
| CN | 104918695 | A | | 9/2015 |
| CN | 105399889 | A | | 3/2016 |
| CN | 105542051 | A | | 5/2016 |
| CN | 106244115 | A | | 12/2016 |
| CN | 106622052 | A | | 5/2017 |
| CN | 106963657 | A | | 7/2017 |
| CN | 105289436 | B | | 11/2017 |
| CN | 107903876 | A | | 4/2018 |
| CN | 107936929 | A | | 4/2018 |
| CN | 108314994 | A | | 7/2018 |
| CN | 109294526 | A | | 2/2019 |
| CN | 109499500 | A | | 3/2019 |
| KR | 20100059510 | A | | 6/2010 |
| WO | 2008046839 | A1 | | 4/2008 |
| WO | 2017101712 | A1 | | 6/2017 |

OTHER PUBLICATIONS

Gupta et. al., "Nanoemulsions: formation, properties, and applications", Soft Matter, vol. 12, p. 2826, 2016.
Wu et al. "One-pot synthesis of nano-capsules with paraffin as core and PMMA-SiO2 as shell by interfacial hydrolysis and polymerization" Materials Science Forum vol. 722, pp. 71-75 2012.
Office Action of corresponding China Invention Patent Application No. 202210462355.7 mailed on Dec. 27, 2023.

* cited by examiner

BURST-RESISTANT, DISPERSIBLE NANO-ENCAPSULATED PHASE-CHANGE MATERIAL AND METHODS FOR PREPARING THE SAME

CROSS REFERENCE OF RELATED APPLICATION

This application claims the benefit of U.S. Provisional Patent Application No. 63/184,187 filed May 4, 2021, which is incorporated herein by reference in its entirety.

FIELD OF THE INVENTION

The present invention generally relates to phase change material. Moreover, the present invention relates to a nano-encapsulated phase-change material and preparation method thereof.

BACKGROUND OF THE INVENTION

Phase change material (PCM) is a substance that changes shape with temperature and can provide latent heat. The thermal energy transition that occurs when a material changes its status from a solid to a liquid or from a liquid to a solid is called "phase transition". Traditional solid or liquid heat storage materials increase their temperatures when absorbing heat. In contrast, when phase change materials absorb and release heat, their temperature remains constant.

In recent years, a novel phase change material has been developed. Encapsulated phase change materials are synthetic polymeric materials composed of core materials and micro- or nano-scale shell capsule materials, in which the shell materials can withstand high and low temperatures and are not affected by temperature changes, and the core material is an organic substance with a phase transition temperature of −50-150° C. These encapsulated phase change materials effectively solve issues of leakage, phase separation, and corrosion that traditional phase change materials encounter.

Several attempts have been made to microencapsulate phase change materials, for example the microcapsules disclosed in U.S. Pat. No. 10,195,577 and US Patent Publication No. 20100068525. However, conventional microencapsulated phase change materials still have some drawbacks, such as low thermal conductivity, low energy storage density, poor coating and suspension ability, and short service cycle time.

CN Patent Application Publication No. 103191670 discloses a method for preparing low-energy nano emulsions. However, the morphology of the final product is liquid emulsion.

Wu et al. illustrates a method to encapsulate 100 nm paraffin emulsion by polymerization of MMA monomer and TEOS from ammonium persulfate as the initiator and catalyst with the proposed mechanism, and using water plus an initiator added gradually to a mixture of paraffin and MMA/TEOS. The resulting particle has the tendency to burst and has a low heat fusion. In effect, the particle demonstrated by Wu has a low energy storage density (Wu, Xiao Lin, et al. "One-Pot Synthesis of Nano-Capsules with Paraffin as Core and PMMA-$SiO_2$ as Shell by Interfacial Hydrolysis and Polymerization." Materials Science Forum. Vol. 722. Trans Tech Publications Ltd, 2012.).

SUMMARY OF THE INVENTION

To address the above-mentioned shortcomings, the present invention provides a nano-encapsulated phase-change material formed by low-energy emulsification followed by polymerization. While retaining the advantages of microencapsulated phase-change material, the size of the nanoencapsulated phase-change material is reduced to the nanometer level, thereby increasing the ratio of the surface area to the volume of the capsule, which augments thermal conductivity among the particles. When a collision occurs, due to the much smaller particle size the overall stress level is greatly reduced. Furthermore, the nanoscale of the nano-encapsulated phase-change material allows even distribution in a carrier medium. The small particle size and the even distribution are advantageous for the final product's durability because it reduces collision damage between particles.

Compared with micro-PCMs on the market, the burst-resistant, dispersible nano-encapsulated phase change material has higher heat transfer efficiency, longer service life, and higher coating and suspension stability. Moreover, the preparation method is a high-yield fabrication process that uses only a small amount of surfactant and energy, which is commercially viable.

Accordingly, a first aspect of the present invention provides a burst-resistant, dispersible nano-encapsulated phase-change material, which includes at least one phase change core material and a shell. The shell includes the final reaction products of a plurality of non-phase change materials including a monomer, an initiator, a crosslinker and surfactants, with the shell encapsulating at least one phase change core material and formed by low-energy emulsification followed by polymerization of a mixture of the phase change core material and the plurality of non-phase change materials in water. A mass ratio between at least one phase change core material and the plurality of non-phase change materials is 5-15:10, and the nano-encapsulated phase-change material after said low-energy emulsification and polymerization has a uniform particle size of 50-500 nm and a heat of fusion of 60 J/g or greater.

In accordance with one embodiment, the crosslinker is selected from one or more of allyl methacrylate (AMA), benzoyl peroxide (BPO), dicumyl peroxide (DCP), dimethyl 3,3'-dithiobispropionimidate (DTBP), or 3-(3,5-di-tert-butyl-4-hydroxyphenyl) propionic acid (DBHP).

In accordance with one embodiment, the plurality of non-phase change materials further includes a chain-transfer agent.

In accordance with one embodiment, the chain-transfer agent is selected from 1-Dodecanethiol (DDT) or dodecyl mercaptan (DDM).

In accordance with one embodiment, at least one phase change core material is selected from one or more of light paraffinic, 25 #phase change paraffin, 30 #phase change paraffin, 35 #paraffin, $C_{12-28}$ n-alkane, $C_{8-18}$ fatty alcohols, $C_{8-18}$ fatty acids and/or ester thereof.

In accordance with one embodiment, at least one phase change core material comprises hexadecane, octadecane, eicosane, laurate, palmitic acid, stearic acid, n-butyl stearate, or any combination thereof.

In accordance with one embodiment, at least one monomer includes vinylbenzene, alpha-methylstyrene, methyl methacrylate (MMA), butyl acrylate (BA), vinyltoluene, styrene, methacrylic acid, acrylic acid, or any combination thereof.

In accordance with one embodiment, at least one initiator includes ammonium persulfate, potassium persulfate, t-butyl hydroperoxide, 2.2'-azobisisobutyronitrile (AIBN), or any combination thereof.

In accordance with one embodiment, at least one surfactant includes polysorbate, sorbitan esters, cetrimonium bromide (CTAB), alkyl polyethoxylate, or any combination thereof.

In accordance with one embodiment, at least one phase change core material is an amount of 100-500 parts by weight of the mixture, and the plurality of non-phase change materials includes: 100-500 parts by weight of monomer, 1-5 parts by weight of initiator, 10-50 parts by weight of crosslinker, 100-500 parts by weight of surfactant, and 1000-6000 parts by weight of water after said low-energy emulsification and polymerization.

A second aspect of the present invention provides a material including a solid or liquid material and dispersed therein.

In accordance with one embodiment, the solid material or the liquid material includes polyurethane (PU), silicone rubber, gypsum, cotton, or polyester textile.

A third aspect of the present invention provides a method for mass producing the burst-resistant, dispersible nano-encapsulated phase-change material, the method including: mixing at least one phase change core material with the plurality of non-phase change materials comprising at least one monomer, an initiator, a crosslinker, and at least one hydrophobic surfactant to form a hydrophobic mixture; heating the mixture at a first temperature which is higher than a melting point of the mixture; dropping an aqueous mixture, which includes water and at least one hydrophilic surfactant, into the mixture with a magnetic stirring at 100-500 rpm for a sufficient period of time to form a nano-emulsion; and heating the nano-emulsion under an inert gas atmosphere to form nanoparticles having a particle size ranging between 50 and 500 nm.

In accordance with one embodiment, the nano-emulsion is heated with a temperature ranging between 60 and 80° C.

In accordance with one embodiment, the method further includes adding a chain-transfer agent into the plurality of non-phase change materials prior to or during mixing with at least one phase change core material.

In accordance with one embodiment, the chain-transfer agent is selected from 1-Dodecanethiol (DDT) or dodecyl mercaptan (DDM).

In accordance with one embodiment, the inert gas is sealed nitrogen.

BRIEF DESCRIPTION OF THE DRAWINGS

In order to clearly illustrate the technical solutions of the embodiments of the present invention, the drawings needed to be used in the description of the embodiments will be briefly introduced below. It is obvious that the drawings in the following description are only some embodiments of the present invention, and it is obvious for those skilled in the art to obtain other drawings based on these drawings without inventive exercise, in which.

DETAILED DESCRIPTION OF THE INVENTION

The present invention will be described in detail through the following embodiments with appending drawings. It should be understood that the specific embodiments are provided for an illustrative purpose only, and should not be interpreted in a limiting manner. Those skilled in the art will appreciate that the invention described herein is susceptible to variations and modifications other than those specifically described.

The invention includes all such variations and modifications. The invention also includes all of the steps and features referred to or indicated in the specification, individually or collectively, and any and all combinations or any two or more of the steps or features. Other aspects and advantages of the invention will be apparent to those skilled in the art from a review of the ensuing description.

Figure 1A:
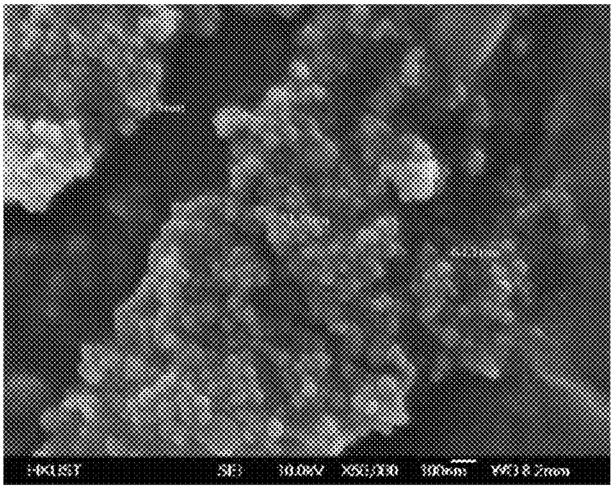
FIG. 1A shows an SEM image of burst-resistant, dispersible nano-encapsulated phase-change material in accordance with one embodiment of the present invention.
Figure 1B:
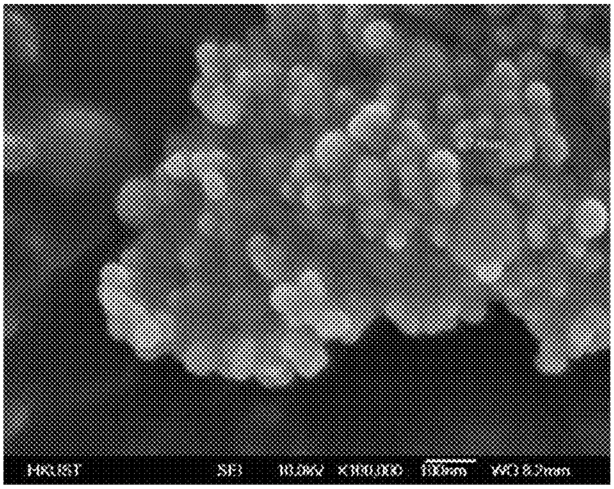
FIG. 1B shows an SEM image of burst-resistant, dispersible nano-encapsulated phase-change material in accordance with another embodiment of the present invention.
Figure 2:
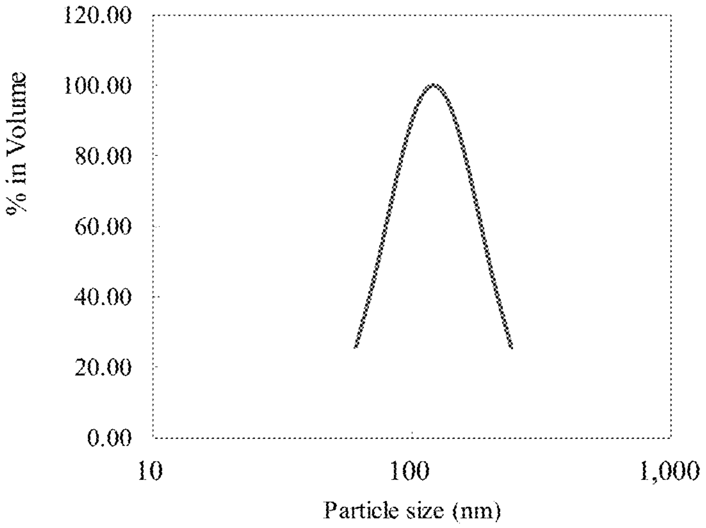
FIG. 2 shows the particle size distribution of the burst-resistant, dispersible nano-encapsulated phase-change material.

FIGS. 1A and 1B show SEM images of burst-resistant, dispersible nano-encapsulated phase-change material. The nano-encapsulated phase-change materials have a uniform particle size, ranging between 50 and 500 nm. For example, in FIG. 1A, the size of the selected individual burst-resistant, dispersible nano-encapsulated phase-change particles ranges between 51.9 and 72.8 nm. In general, any individual burst-resistant, dispersible nano-encapsulated phase-change material has a particle size less than 500 nm. The particle size distribution plot is shown in FIG. 2 as the % in volume against particle size in nanometer. The peak of the curve indicates the majority of the particles has a particle size falling at approximately between 100 and 300 nm after the low-energy emulsification and polymerization process.

Figure 3:
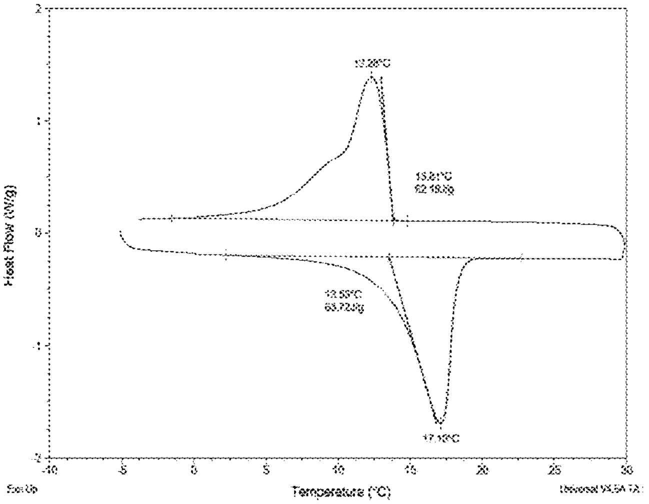
FIG. 3 shows the differential scanning calorimetry (DSC) spectrum of the burst-resistant, dispersible nano-encapsulated phase-change material.

A DSC spectrum of the burst-resistant, dispersible nano-encapsulated phase-change material is shown in FIG. 3. The x-axis indicates the temperature in Celsius degrees, and the y-axis indicates the heat flow (W/g). Heat fusion indicates the amount of energy required to change the burst-resistant, dispersible nano-encapsulated phase-change material core from a solid to a liquid state. The heat fusion value of the burst-resistant, dispersible nano-encapsulated phase-change material can be calculated from the results of the DSC spectrum. As shown in FIG. 3, the burst-resistant, dispersible nano-encapsulated phase-change material has a heat fusion value over 60 J/g.

Figure 4:
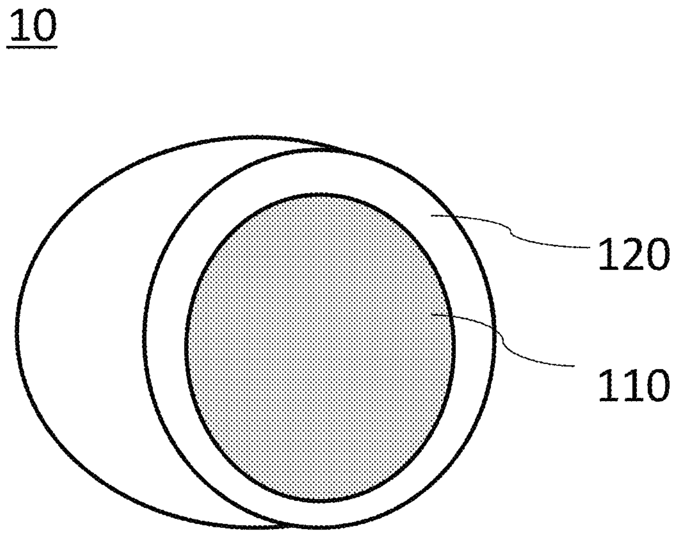
FIG. 4 shows a cross-sectional schematic diagram of an individual burst-resistant, dispersible nano-encapsulated phase change material particle.

FIG. 4 shows a cross-sectional schematic diagram of an individual burst-resistant, dispersible nano-encapsulated phase-change material particle 10. The burst-resistant, dispersible nano-encapsulated phase-change material particle 10 has at least one phase-change core material 110 and a shell 120. The phase-change core material 110 includes, but is not limited to, light paraffinic, 25 #phase change paraffin, 30 #phase change paraffin, 35 #paraffin, C12-28 n-alkane, C8-18 fatty alcohols, C8-18 fatty acids and/or an ester thereof. The term "number #" means a melting temperature of the phase change core material. For example, 25 #indicates the melting temperature of phase change core material is 25° C. In an embodiment, the phase change core material 110 includes hexadecane, octadecane, eicosane, laurate, palmitic acid, stearic acid, n-butyl stearate, or any combination thereof.

The shell 120 is formed by low-energy emulsification followed by polymerization of a mixture of the phase change core material and the non-phase change materials in water. The low-energy emulsification will be discussed in more detail in FIGS. 5A to 5C. A mass ratio between the phase change core material and non-phase change materials is 1-15:10. In an embodiment, the mass ratio between the phase change core material and the non-phase change material is 5-15:10.

The shell 120 includes the reaction product of a plurality of non-phase change materials including at least one monomer, an initiator, and a crosslinker. The shell 120 encapsulates the phase change core material 110.

The monomer may include, but is not limited to, alphamethylstyrene, methyl methacrylate (MMA), butyl acrylate (BA), vinyltoluene, styrene, methacrylic acid and acrylic acid, or any combination thereof. The initiator of the shell 120 may include, but is not limited to, ammonium persulfate, potassium persulfate, t-butyl hydroperoxide, 2.2'-azobisisobutyronitrile (AIBN), or any combination thereof. The crosslinker of the shell 120 may include, but is not limited to, allyl methacrylate (AMA), benzoyl peroxide (BPO), dicumyl peroxide (DCP), dimethyl 3,3'-dithiobispropionimidate (DTBP), 3-(3,5-di-tert-butyl-4-hydroxyphenyl) propionic acid (DBHP), or any combination thereof. The surfactant may include, but is not limited to, polysorbate, sorbitan esters, cetrimonium bromide (CTAB), alkyl polyethoxylate, or any combination thereof. The plurality of non-phase change materials further includes a chain-transfer agent, including but not limited to 1-Dodecanethiol (DDT) or dodecyl mercaptan (DDM).

In one embodiment, the phase change core material 110 is an amount of 100-500 parts by weight of the mixture of the phase change core material 110 and the shell 120 made from the non-phase change materials. The non-phase change materials include the monomer in 100-500 parts by weight of the mixture, the initiator in 1-5 parts by weight of the mixture, the crosslinker in 10-50 parts by weight of the mixture, surfactant in 100-500 parts by weight of the mixture, and water in 1000-6000 parts by weight of the mixture after the low-energy emulsification and polymerization.

Conventionally, preparing phase change material entails a high-energy emulsification process that relies on a mechanical force (high pressure homogenizer) to achieve its desired particle size. The method described below adopts a low-energy emulsification step by phase inversion, which relies on chemical energy, to prepare a high concentration of phase change core material nanoemulsion, which has the advantage of high yield. The resulting phase change material nanoemulsion can be easily scaled up to an industrial level. Furthermore, the polymerization and encapsulation processes are made by in-situ polymerization.

The method for mass producing the burst-resistant, dispersible nano-encapsulated phase-change material starts with pre-polymerization. The phase change core material and certain non-phase change materials, including the monomers and hydrophobic surfactants, are combined to form a mixture. Next, the mixture is heated to a temperature higher than a melting point of the mixture, with constant stirring at 100-500 rpm for a period of time until a hydrophobic mixture 500 shown in FIG. 5A is formed.

Figure 5A:
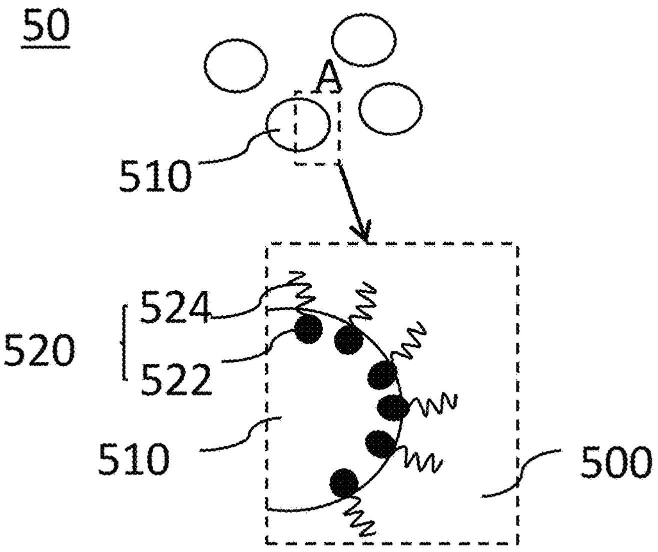
FIGS. 5A to 5C show a schematic diagram of the low-energy emulsification process.

Turning to FIG. 5A, the first stage of the low-energy emulsification 50 is shown. An amount of water which includes hydrophilic surfactants 520 is added to the hydrophobic mixture 500. The aqueous mixture which includes water and hydrophilic surfactants 520 is added in a constant drop-wise flow to the hydrophobic mixture 500. Once the aqueous mixture is added to the hydrophobic mixture 500, aqueous micro-droplets 510 are formed. An area A of a portion of an individual aqueous micro-droplet 510 is shown as an enlarged view in the dotted area in FIG. 5A. The surfactant 520 has a hydrophilic head 522 and a hydrophobic tail 524. In the state of the aqueous micro-droplet 510, the hydrophilic head 522 of the surfactant 520 faces inwardly and concentrically to form a negative curvature. The hydrophobic tail 524 is exposed on the surface of the initial particle 510 in the hydrophobic mixture 500. At this stage, the solution is in a water/oil microemulsion 50A.

Figure 5B:
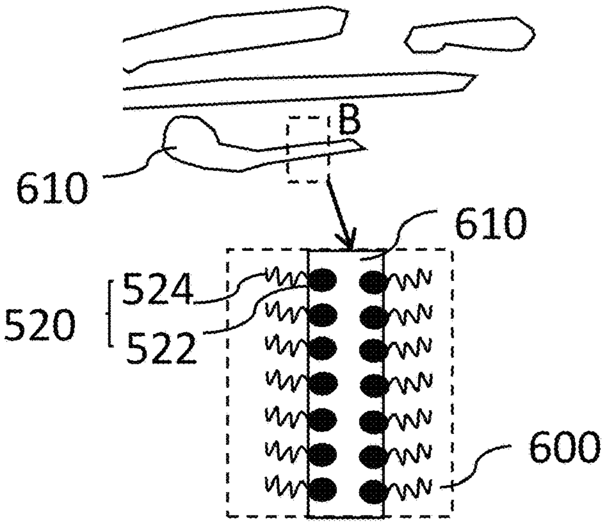

In the second stage of the low-energy emulsification 50, which is shown in FIG. 5B, a bicontinuous phase 50B is formed. An area B of a portion of an aqueous phase 610 is shown as an enlarged view in the dotted area. The hydrophilic heads 522 of the surfactant 520 remain inwardly oriented towards each other, while the hydrophobic tails 524 are exposed. Unlike the aqueous micro-droplet 510, the aqueous phase 610 is not in a spherical shape.

Figure 5C:
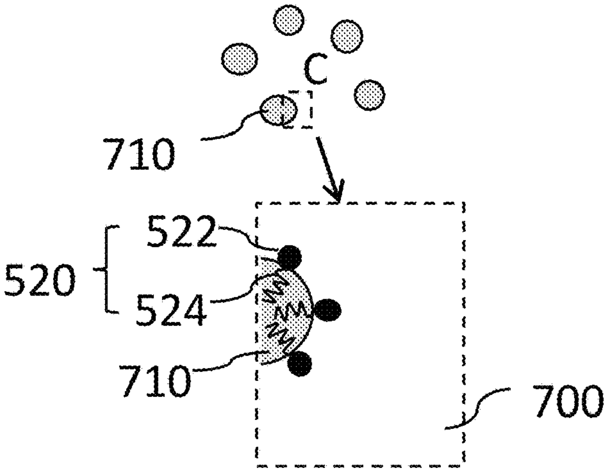

In the third stage of the low-energy emulsification 50, which is shown in FIG. 5C, a homogeneous oil/water nanoemulsion 50C is formed. An area C of a portion of an individual precursor nano-droplet 710 is shown as an enlarged view in the dotted area. The surfactant 520 leads a phase inversion to form the precursor nano-droplet 710. The hydrophilic head 522 points outwardly and is exposed, while the hydrophobic tail 524 is encircled by the hydrophilic head 522. A phase inversion occurs during the low-energy emulsification 50. This phase inversion is achieved by the addition of the aqueous mixture and the change of the reaction conditions. More specifically, in the low-energy emulsification 50, the first stage as shown in FIG. 5A is under a first temperature at the start. In order to reach the third stage as shown in FIG. 5C, a second temperature, which is lower than the first temperature, might be applied during the addition of the aqueous mixture. The surfactant 520 can be temperature sensitive, for example polyoxyethylene surfactants. Alternatively, the change of condition may be achieved by the tuning of the water and oil ratio in the solution.

During the low-energy emulsification, a constant magnetic stirring at 100-500 rpm for a period of time, for example 15-30 minutes, is applied. It should be noted that the droplet size shrinks along the course of the low-energy emulsification 50. The micro-droplet 510 as shown in FIG. 5A has a much larger radius than the nano-droplet 710 as shown in FIG. 5C. The low-energy emulsification process produces smaller particles with a uniform size for the subsequent polymerization.

After the low-energy emulsification, polymerization is performed. The homogeneous nanoemulsion 50C as shown in FIG. 5C is heated to a temperature in a range between 60 and 80° C. for 4-6 hours. During the incubation period, a constant stirring at 300-600 rpm under an inert gas atmosphere is required to obtain the burst-resistant, dispersible nano-encapsulated phase-change material particle 10, as shown in FIG. 4, with a uniform particle size of about 50-500 nm. The inert gas may be sealed nitrogen.

In one embodiment, the method further includes a step of adding a chain-transfer agent into the non-phase change materials prior to or during mixing with at least one phase change core material. The chain-transfer agent is selected from, but not limited to, 1-Dodecanethiol (DDT) or dodecyl mercaptan (DDM).

The burst-resistant, dispersible nano-encapsulated phase-change material has many advantages over conventional microcapsule phase change material. For example, conventional microcapsule phase change material has a high tendency to break and undergo phase separation after an ultra-sonic water bath. The breakage of such conventional microcapsule phase change material particle is naked-eye visible. The same applies to the phase separation. However, in contrast, the burst-resistant, dispersible nano-encapsulated phase-change material of the present invention is in a homogenized liquid form after the ultra-sonic water bath. That is, the burst-resistant, dispersible nano-encapsulated phase-change material is more stable and evenly distributed than the conventional microcapsule phase change material after the same treatment (ultra-sonic water bath for 10 minutes).

When the burst-resistant, dispersible nano-encapsulated phase-change material is used together with other materials to make a product—for example, in textiles—the final product exhibits an effective buffer balancing heat against ambient temperature fluctuations. For example, the thermal comfort of clothing can be improved. The thermal transfer efficiency is also increased. The burst-resistant, dispersible nano-encapsulated phase-change material may also be used in chillers to improve the efficiency of their heat exchange processes.

In one embodiment, the burst-resistant, dispersible nano-encapsulated phase-change material is used as roofing and shielding material. For example, when applied to HVAC/building envelopes, it improves indoor thermal comfort and HVAC efficiency because of its high heat fusion rate. In another embodiment, the burst-resistant, dispersible nano-encapsulated phase-change material is applied to the surface of electronics, where it acts as a coolant or heat dissipating system. In yet another embodiment, when the burst-resistant, dispersible nano-encapsulated phase-change material is used as a component in coating material, it regulates the temperature of the coated device. In another embodiment, the burst-resistant, dispersible nano-encapsulated phase-change material is applied directly to packaging.

The present invention also provides a matrix material, which includes a solid or liquid material and the burst-resistant, dispersible nano-encapsulated phase-change material dispersed therein. In one embodiment, the solid material or the liquid material includes, but is not limited to, polyurethane (PU), silicone rubber, gypsum, cotton, or polyester textile.

Figure 6:
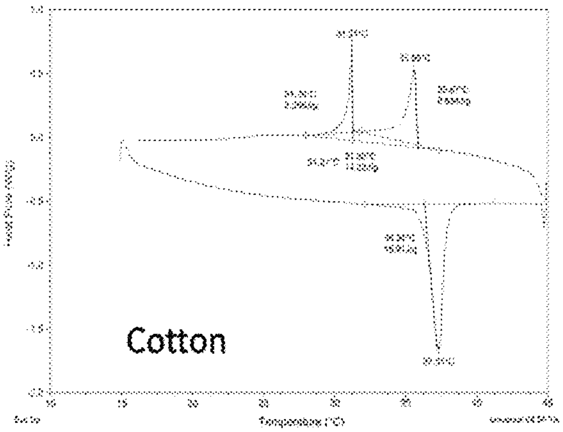
FIG. 6 shows the DSC spectrum of a burst-resistant, dispersible nano-encapsulated phase change material in a matrix in accordance with one embodiment of the present invention.
Figure 7:
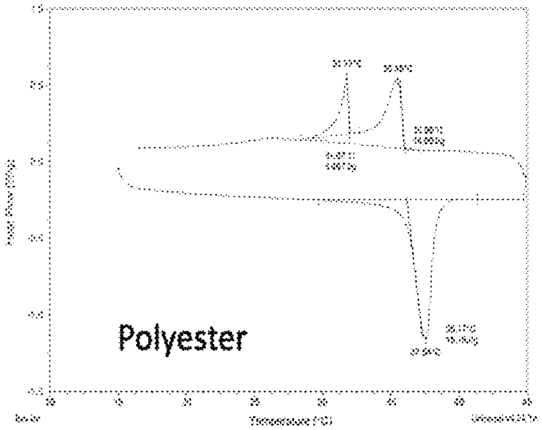
FIG. 7 shows the DSC spectrum of a burst-resistant, dispersible nano-encapsulated phase change material in a matrix in accordance with another embodiment of the present invention.

The matrix material is prepared by the following steps. First, dispersing the burst-resistant, dispersible nano-encapsulated phase-change material in a solid material or the liquid material such as PU solution in a ratio of 1:1. Next, coating the burst-resistant, dispersible nano-encapsulated phase-change material in PU solution on the cotton or polyester textile. The coated cotton or polyester textile is then dried in air for 24 hours. The matrix material can subsequently be coated on clothes. The final weight fractions of the matrix material are over 60%. As shown in FIGS. 6 and 7, the DSC spectrum plots show that the coated cotton and polyester textiles have heat of fusion at 16 J/g and 18 J/g, respectively.

In one embodiment, the method includes adding a formed nano-encapsulated phase-change material into a solid material or a liquid material and mixing evenly to obtain the nano-encapsulated phase-change material dispersed in the solid or liquid material. In one embodiment, the solid material or the liquid material includes, but is not limited to, polyurethane (PU), silicone rubber, gypsum, cotton, or polyester textile.

The following examples illustrate the present invention and are not intended to limit the same.

Nano-Encapsulated Phase-Change Material Composition

EXAMPLE 1

Table 1 shows the composition of a burst-resistant, dispersible nano-encapsulated phase-change material in accordance with an embodiment of the present invention. In Table 1, PCM refers to phase change core material. In this embodiment, C14-20 alkane is used as the PCM. The remaining reaction ingredients include non-phase change materials, which will form the base of the shell 120 as shown in FIG. 4. The non-phase change materials in this embodiment include Tween 80 and Span 80 as surfactant, methyl methacrylate (MMA) and styrene as monomers, allyl methacrylate as crosslinker, and AIBN as initiator.

TABLE 1

| | Chemical | Weight | Percentage |
|---|---|---|---|
| PCM | C14-20 alkane | 10 g | 28.5% |
| Surfactants | Tween 80 | 6 g | 31.3% |
| | Span 80 | 5 g | |
| Monomers | Methyl methacrylate (MMA) | 6 g | 40.2% |
| | Styrene | 6 g | |
| Crosslinker | Allyl methacrylate | 2 g | |
| Initiator | AIBN (azodiisobutyronitrile) | 0.1 g | |

EXAMPLE 2

Table 2 shows another composition of a burst-resistant, dispersible nano-encapsulated phase-change material in accordance with an embodiment of the present invention. In Table 2, PCM refers to phase change core material. In this embodiment, eicosane is used as the PCM with methacrylic acid and styrene as monomers. The remaining reaction ingredients are the same as in Example 1. However, the weight of the ingredients differs from Example 1.

TABLE 2

| | Chemical | Weight | Percentage |
|---|---|---|---|
| PCM | Eicosane (36-38° C.) | 14 g | 27.5% |
| Surfactants | Tween 80 | 6.5 g | 24.6% |
| | Span 80 | 6 g | |
| Monomers | Methacrylic acid | 11 g | 47.9% |
| | Styrene | 11 g | |
| Crosslinker | Allyl methacrylate | 2 g | |
| Initiator | AIBN (azodiisobutyronitrile) | 0.4 g | |

The difference between Example 1 and Example 2 is the type of PCM and monomers. By employing different types of PCM and shells, a higher or lower working temperature may be achieved when the burst-resistant, dispersible nano-encapsulated phase-change material is used in different applications.

Fabrication of the Burst-Resistant, Dispersible Nano-Encapsulated Phase-Change Material The phase change core material, at least one emulsifier, and at least one non-phase change material are mixed together and stirred at 40° C. for 20 minutes until the content is totally dissolved. DI water of 200 g is then added to the mixture after at least 20 minutes but no more than 30 minutes. Next, an inert gas such as $N_2$ is aerated into the mixture container for 20 minutes to exhaust air. Finally, the mixture is heated to 70° C. in a water bath to complete the polymerization in about 6 hours. The final product can be stored within a sealed bottle.

EXAMPLE 3

Fabrication of Burst-Resistant, Dispersible Nano-Encapsulated Phase-Change Material/Waterborne PU Latex Mixture The burst-resistant, dispersible nano-encapsulated phase-change material and PU latex are mixed together. The solid ratio of PU and the burst-resistant, dispersible nano-encapsulated phase-change material is controlled at a ratio between 1:5 and 1:15. Next, the mixture is treated by ultra-sonication for 30 minutes with ice bath. The resulting mixture is then coated on a fabric.

Referring to Table 3, when the solid ratio of PU and burst-resistant, dispersible nano-encapsulated phase-change material is at 1:5, the heat fusion of the final product is 23.15 J/g. When the solid ratio of PU and burst-resistant, dispersible nano-encapsulated phase-change material is at 1:15, the heat fusion of the final product is 30.16 J/g.

TABLE 3

| Solid ratio of PU and nano PCM in mixture | Content in final products | | | Heat of fusion (J/g) |
|---|---|---|---|---|
| | Fabric | PU | Nano-PCM | |
| 1:5 | 55.09% | 7.48% | 37.42% | 23.15 |
| 1:15 | 54.76% | 2.83% | 42.42% | 30.16 |

It will be appreciated by those skilled in the art, in view of these examples, that alternative embodiments may be implemented without undue experimentation or deviation from the spirit or scope of the invention, as set forth in the appended claims. This invention is to be limited only by the following claims, which include all such embodiments and modifications when viewed in conjunction with the above specification and accompanying drawings.

What is claimed is:

1. A phase-change matrix, comprising:

a solid or liquid material, wherein the solid material or the liquid material comprises polyurethane (PU), silicone rubber, gypsum, cotton, or polyester textile, a burst-resistant, dispersible nano-encapsulated phase-change material dispersed therein, the burst-resistant, dispersible nano-encapsulated phase-change material has a core-shell morphology formed by phase inversion during a low energy emulsification process, comprising:

at least one phase change core material;

a shell comprising a reaction product of a plurality of non-phase change materials comprising at least one monomer, an initiator, a crosslinker and at least one surfactant;

wherein the shell surrounding the at least one phase change core material and formed by the low energy emulsification followed by a polymerization of a mixture of the phase change core material and the plurality of non-phase change materials in water;

wherein the surfactant molecules are arranged with hydrophilic heads facing outward and hydrophobic tails oriented toward the phase change core material, thereby uniformly encapsulating the phase change core material in a nanodroplet prior to the polymerization;

wherein a mass ratio between the at least one phase change core material and the plurality of non-phase change materials is 5-15:10;

wherein the phase change core material is in an amount of 100-500 parts by weight of the mixture, and the plurality of non-phase change materials comprises:

100-500 parts by weight of monomer;

1-5 parts by weight of initiator;

10-50 parts by weight of crosslinker;

100-500 parts by weight of surfactant; and 1000-6000 parts by weight of water; and wherein the nano-encapsulated phase-change material after said low energy emulsification and polymerization has a particle size ranging between 50 and 500 nm and a heat of fusion of 60 J/g or greater.

2. The phase-change matrix of claim 1, wherein the crosslinker is selected from one or more of allyl methacrylate (AMA), benzoyl peroxide (BPO), dicumyl peroxide (DCP), dimethyl 3,3'-dithiobispropionimidate (DTBP), or 3-(3,5-di-tert-butyl-4-hydroxyphenyl) propionic acid (DBHP).

3. The phase-change matrix of claim 1, wherein the plurality of non-phase change materials further comprises a chain-transfer agent.

4. The phase-change matrix of claim 3, wherein the chain-transfer agent is selected from 1-Dodecanethiol (DDT) or dodecyl mercaptan (DDM).

5. The phase-change matrix of claim 1, wherein the at least one phase change core material is one or more selected from light paraffinic, 25 #phase change paraffin, 30 #phase change paraffin, 35 #paraffin, $C_{12-28}$ n-alkane, $C_{8-18}$ fatty alcohols, $C_{8-18}$ fatty acids and/or ester thereof.

6. The phase-change matrix of claim 1, wherein the at least one phase change core material comprises hexadecane, octadecane, eicosane, laurate, palmitic acid, stearic acid, and n-butyl stearate, or any combination thereof.

7. The phase-change matrix of claim 1, wherein the monomer comprises styrene, alpha-methylstyrene, methyl methacrylate (MMA), butyl acrylate (BA), vinyltoluene, methacrylic acid, and acrylic acid, or any combination thereof.

8. The phase-change matrix of claim 1, wherein the at least one initiator comprises ammonium persulfate, potassium persulfate, t-butyl hydroperoxide, and 2.2'-azobisisobutyronitrile (AIBN), or any combination thereof.

9. The phase-change matrix of claim 1, wherein the at least one surfactant comprises polysorbate, sorbitan esters, cetrimonium bromide (CTAB), and alkyl polyethoxylate, or any combination thereof.

* * * * *